United States Patent
Erech et al.

(10) Patent No.: US 6,848,880 B2
(45) Date of Patent: Feb. 1, 2005

(54) CARGO RACK

(75) Inventors: Saul Erech, Water Gap, PA (US);
Dexter J. Fowler, Bedford, PA (US);
James A. Kirk, Hyattsville, PA (US)

(73) Assignee: New Enterprise Stone & Lime Co., Roaring Springs, PA (US)

(*) Notice: Subject to any disclaimer, the term of this patent is extended or adjusted under 35 U.S.C. 154(b) by 0 days.

(21) Appl. No.: 10/314,534

(22) Filed: Dec. 9, 2002

(65) Prior Publication Data

US 2003/0210965 A1 Nov. 13, 2003

Related U.S. Application Data

(60) Provisional application No. 60/378,359, filed on May 8, 2002, and provisional application No. 60/396,951, filed on Jul. 18, 2002.

(51) Int. Cl.$^7$ ................................................. B60P 9/00
(52) U.S. Cl. ........................................ 414/462; 410/44
(58) Field of Search ............................ 414/462; 410/44, 410/46, 77; 224/282, 545, 548, 553

(56) References Cited

U.S. PATENT DOCUMENTS

| | | | |
|---|---|---|---|
| 1,519,319 A | | 12/1924 | Manning |
| 2,676,720 A | * | 4/1954 | Noble .......................... 414/462 |
| 2,725,241 A | | 11/1955 | Leonard, Jr. |
| 2,808,288 A | | 10/1957 | Benson |
| 2,903,274 A | | 9/1959 | Leonard, Jr. |
| 3,154,207 A | | 10/1964 | Long |
| 3,348,713 A | * | 10/1967 | Will ............................ 414/462 |
| 3,458,073 A | * | 7/1969 | Dawson ....................... 414/462 |
| 3,655,218 A | | 4/1972 | Taylor |
| 3,757,975 A | * | 9/1973 | Sneider ........................ 414/462 |
| 3,843,001 A | * | 10/1974 | Willis .......................... 414/462 |
| 3,871,540 A | * | 3/1975 | Jenkins ........................ 414/462 |
| 3,931,903 A | * | 1/1976 | Johnson ....................... 414/462 |
| 4,189,274 A | * | 2/1980 | Shaffer ........................ 414/462 |
| 5,029,740 A | * | 7/1991 | Cox ............................ 224/484 |
| 5,456,564 A | * | 10/1995 | Bianchini .................... 414/462 |
| 5,567,107 A | * | 10/1996 | Bruno et al. ................. 414/462 |
| 5,683,213 A | * | 11/1997 | Baur et al. ..................... 410/44 |
| 5,785,472 A | | 7/1998 | Smith et al. |
| 5,857,824 A | * | 1/1999 | De Aquiar ................... 414/462 |
| 5,909,989 A | | 6/1999 | Baur et al. |
| 5,947,665 A | * | 9/1999 | Baur et al. ..................... 410/44 |
| 6,092,972 A | * | 7/2000 | Levi ............................ 414/462 |
| 6,164,895 A | * | 12/2000 | Croswell ...................... 414/462 |
| 6,217,053 B1 | * | 4/2001 | Forsythe et al. ........... 280/414.3 |
| 6,318,929 B1 | * | 11/2001 | Basta ............................. 405/3 |
| 6,364,597 B2 | * | 4/2002 | Klinkenberg ................ 414/462 |
| 6,435,801 B2 | * | 8/2002 | Talbott ........................ 414/462 |
| 6,461,095 B1 | * | 10/2002 | Puska .......................... 414/462 |

FOREIGN PATENT DOCUMENTS

| | | |
|---|---|---|
| SU | 1111913 | 9/1984 |
| SU | 1207850 | 1/1986 |

OTHER PUBLICATIONS

Photo of Miss Bardahl on tilt trailer, taken 1959.
Photo of Miss Bardhal on tilt trailer, taken 1996.
Photos (2) of Hydroplane Tilt–Frame Trailer constructed in 1957, taken Oct. 24, 2002.
Photos (2) of Hydroplane Tilt–Frame Trailer constructed in the 1960s or earlier, taken Oct. 24, 2002.

* cited by examiner

Primary Examiner—Douglas Hess
(74) Attorney, Agent, or Firm—Pepper Hamilton LLP

(57) ABSTRACT

An apparatus for transporting cargo includes a longitudinal rotatable support arm and at least one bracing arm that extending in a substantially perpendicular direction from the longitudinal arm. No more than one of the bracing arms contacts and supports a corner of the cargo. At least one of the bracing arms preferably includes an extendable assembly for providing at least partial support of the cargo. The extendable assembly may include, for example, a sleeve and a movable structure located within the sleeve, wherein the movable structure may be extended from the sleeve to contact the cargo.

16 Claims, 5 Drawing Sheets

CARGO RACK

RELATED APPLICATIONS

This application claims priority to U.S. Provisional Patent Application No. 60/378,359, filed May 8, 2002 and to U.S. Provisional Patent Application No. 60/396,951, filed Jul. 18, 2002, each of which is incorporated herein by reference in its entirety.

FIELD OF THE INVENTION

The present invention relates generally to cargo racks for supporting wide cargo in an inclined position during transport by road, rail, water or other means in order to decrease the apparent width of the cargo. More particularly, the present invention relates to tiltable cargo racks having a rotatably mounted longitudinal arm with a plurality of upwardly extending members for support of the cargo.

BACKGROUND OF THE INVENTION

Prior art tiltable cargo racks for supporting large pre-cast concrete structures had a longitudinal arm rotatable from a horizontal loading position to an inclined transport position. An example of such a rack is described in U.S. Pat. No. 5,947,665 to Baur et al., FIGS. 1–4 and the corresponding text of U.S. Pat. No. 5,947,665 are incorporated herein by reference in their entirety. In such prior cargo racks, a plurality of upwardly extending members of specified length was required for simultaneously contacting and supporting respective corners of the structure. Adequate support was not provided in the event that the pre-cast concrete structure had one or more corners at a height differing from the length of one or more of the corresponding upwardly extending members of the rack. Also, adequate support was not provided to prevent unintentional tilting of the rack during cargo loading.

Accordingly, it is desirable to provide a tiltable cargo rack that provides adequate support for the cargo without requiring a plurality of upwardly extending members of specified length that simultaneously contact and support respective corners of the cargo.

SUMMARY OF THE INVENTION

It is therefore a feature and advantage of the present invention to provide a cargo rack that is securely retained in a horizontal position during cargo loading. The invention prevents unintentional tilting of the rack and does not require upwardly extending members of a specified length for simultaneous contact and support of corresponding corners of the cargo.

It is another feature and advantage of the invention to provide a cargo rack that securely retains the cargo in position during tilting of the rack without requiring a plurality of upwardly extending members of specified length for simultaneously contacting and supporting respective corners of the cargo.

The above and other features and advantages are achieved through the use of a novel cargo rack as herein disclosed. In accordance with one embodiment of the present invention, a cargo rack is provided which comprises: (1) a longitudinal arm, for support of cargo, said longitudinal arm being rotatable from a substantially horizontal loading position to an inclined transport position; (2) at least one support member to support the arm securely in a substantially horizontal loading position, wherein at least one of the support members is selectively movable from a support position to a retracted position in order to permit rotation of the longitudinal arm to an inclined position for cargo transport; and (3) at least one leg that is attached to and substantially perpendicular to the longitudinal arm, wherein no more than one of the legs contacts and supports a corner of the cargo. Optionally, the invention includes an extendable assembly located within at least one of the legs for further supporting the cargo. The extendable assembly may include, for example, a sleeve and a movable structure located within the sleeve, wherein the movable structure may be extended from the sleeve to contact the cargo.

In accordance with an alternate embodiment of the invention, an apparatus for transporting cargo, includes (1) a longitudinal arm that is rotatable from a substantially horizontal loading position to an inclined transport position; and (2) at least one bracing arm extending upwardly and in a substantially perpendicular direction from the longitudinal arm, wherein at least one of the bracing arms includes an extendable assembly for providing at least partial support of the cargo. The extendable assembly may include, for example, a sleeve and a movable structure located within the sleeve, wherein the movable structure may be extended from the sleeve to contact the cargo. The extendable assembly may also include a grippable member for extending the movable structure from the sleeve and retracting the movable structure into the sleeve, and the movable structure may comprise an inner sleeve. The movable structure may also include a planar structure for contacting the cargo.

In accordance with another embodiment of the invention, a cargo rack, includes: (1) a longitudinal arm, said longitudinal arm being rotatable from a substantially horizontal position to an inclined transport position; and (2) at least one bracing arm extending from the longitudinal arm. At least one of the bracing arms preferably includes an extendable assembly, and the extendable assembly preferably comprises a sleeve and a movable structure.

In accordance with another embodiment of the invention, a cargo rack includes a longitudinal arm for support of cargo, where the longitudinal arm is rotatable from a substantially horizontal loading position to an inclined transport position. This embodiment also includes one or more bracing arms that extend from the longitudinal arm in a substantially perpendicular direction. In this embodiment, at least one of the bracing arms has a length so that when the cargo is loaded on the rack, no more than one bracing arm contacts or supports a corner of the cargo.

It is to be understood that the invention is not limited in its application to the details of construction and to the arrangements of the components set forth herein or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be used as a basis for designing other structures, methods and systems for carrying out the several purposes of the invention. Thus, the invention is not limited to the exact construction and operation illustrated and described, and accordingly all appropriate modifications and equivalents may fall within the scope of the invention.

DETAILED DESCRIPTION OF PREFERRED EMBODIMENTS OF THE INVENTION

A preferred embodiment of the present invention provides a tiltable cargo rack having a rotatably mounted longitudinal arm with a plurality of members extending generally perpendicularly upwardly from said arm. A plurality of horizontally spaced supports is provided beneath the arm to support the arm securely in a substantially horizontal loading position. A support near or adjacent to one end of the longitudinal arm is selectively movable from a vertical support position to a retracted position in order to permit rotation of the longitudinal arm to an inclined position for cargo transport. Preferably, the movable support is pivotable to a retracted position that is substantially parallel to the longitudinal arm. More preferably, the movable support is a post that is pivotably mounted at one end to the longitudinal arm near or adjacent to one end of the longitudinal arm. Most preferably, a selectively releasable and engageable lock is provided for alternately securing the movable support in the substantially vertical support position and permitting its movement to a retracted position.

Figure 1:
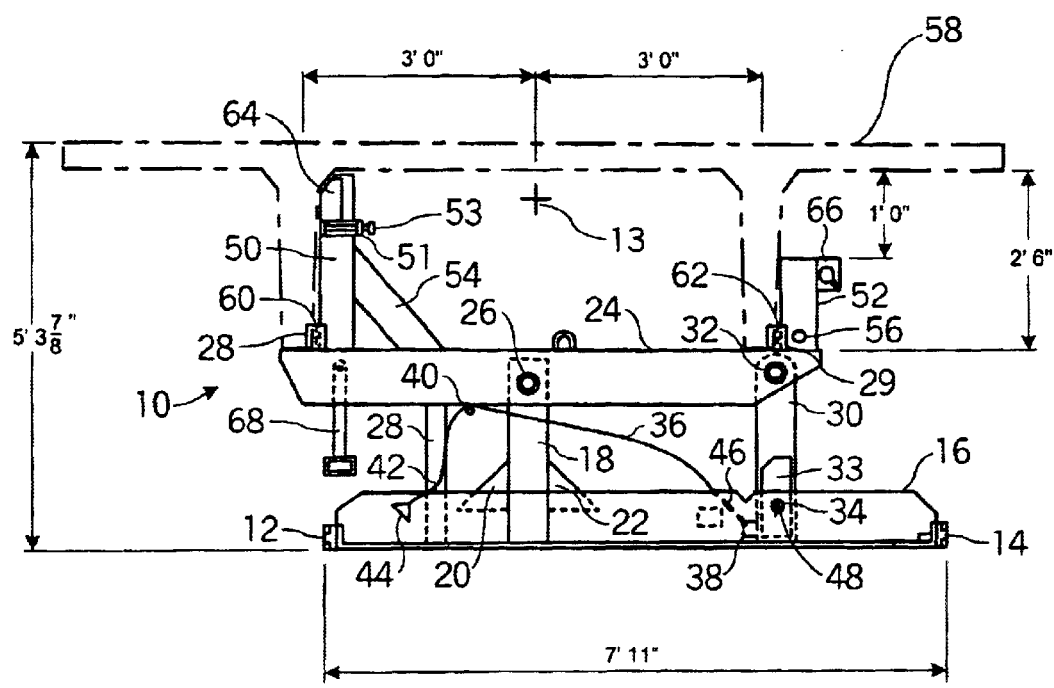
FIG. 1 provides a side elevation view illustrating several elements of a preferred embodiment of the present invention.

A preferred embodiment of the present inventive apparatus is illustrated in FIG. 1. Referring to FIG. 1, cargo rack 10 has a base which, for example, may include spaced steel angle irons 12 and 14 and a plurality of spaced cross plates, one of which is shown at 16. A fixed, preferably substantially vertical, upright support which may, for example, comprise a pair of spaced plates, one of which is shown at 18, are welded, bolted or otherwise secured to corresponding spaced cross plates. Optional triangular braces 20 and 22 provide additional support for the fixed vertical upright support. Longitudinal arm 24 is rotatably mounted, preferably at about its mid-length point, to an upper part of the fixed vertical upright support by pipe pin 26. A vertical support post 28 is provided for support of the longitudinal arm near or adjacent to one end of the arm. Support post 28 preferably is attached at its upper end to the lower surface of arm 24, and its bottom end is not attached to the base. It is to be understood, however, that the bottom end of the support post may be attached to the base with the other end not being attached to the arm, resulting in a retracted position wherein support post 24 is preferably substantially parallel to the base.

Another support post 30 is provided adjacent an opposite end of longitudinal arm 24 from that in which post 28 is located and preferably comprises a pair of spaced plates pivotably attached at their upper ends to arm 24 by pipe pin 32. Post 30 optionally and preferably includes lower foot member 33 pivotably mounted to the pair of spaced plates of the post by pipe 34. A cable 36 is attached at one end to an eye loop 38 on foot member 33. Cable 36 is preferably threaded over pulley 40 through eyelet 42 and has a handle 44 at its opposite end. Coil spring 46 is attached at one end to cable 36 and to foot member 33 at the other end. Pin 48 is selectively actuable by a lever arm (not shown) for engagement in pipe 34 and retractable from pipe 34. Preferably, the lever arm may be locked in position when pin 48 is engaged in pipe 34 so that the pin will not be accidentally disengaged from pipe 34.

Figure 4:
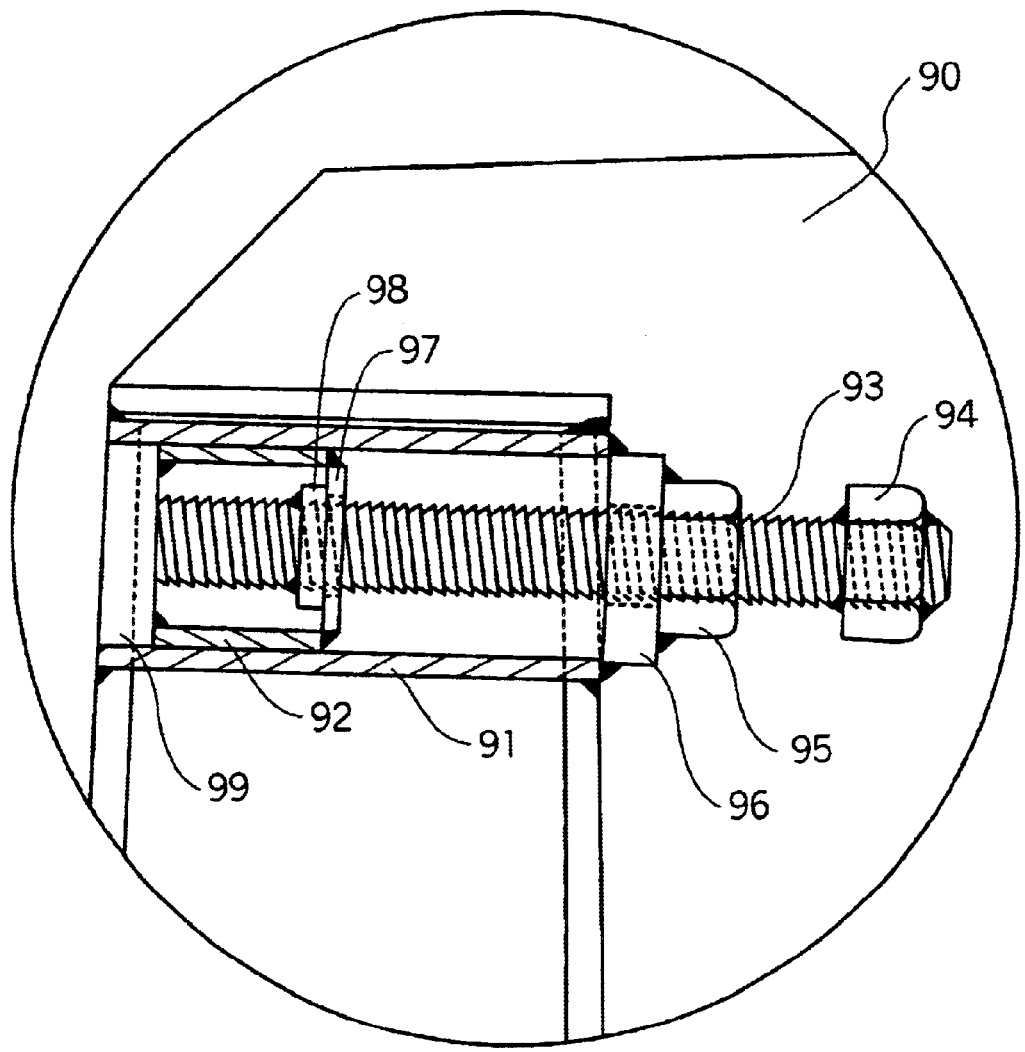
FIG. 4 is a close-up view of a preferred extendable assembly (in this illustration a bolt and sleeve apparatus) that may be used as an element of the invention.

A plurality of members 50 and 52 extend generally perpendicularly upwardly from longitudinal arm 24 and are secured to the arm by welding, bolting or other means. Optional angular brace 54 is secured at one end to longitudinal arm 24 and to member 50 at its other end to support member 50. Member 52 preferably has pipe 56 located so as to be engageable by pin 48 when longitudinal arm 24 is rotated clockwise to the inclined transport position which is to the right in FIG. 1. Member 50 may have a shape at its upper end for abutting a corresponding corner of cargo 58. Sleeve 51 mounted transversely in member 50 receives bolt assembly 53 which can be turned to adjust its position, for example to a retracted position (to the right in FIG. 1) out of contact with a downwardly extending leg of cargo 58. Alternately, bolt 53 may be turned and adjusted to an extended position (to the left in FIG. 1) for contact and support of the leg of cargo 58. A pressure plate may be attached or secured to the end of bolt 53 for contact with the leg of cargo 58 in order to spread the force for support of the leg over a greater area. Alternatively, as shown in FIG. 4 and as described below bolt assembly 53 may be included in a sleeve device that extends to contact and support a leg of the cargo. In addition, members 50 and 52 preferably have rubber or plastic pads, for example, as shown at 60, 62 and 64 for abutting cargo 58. Such pads may also be located between the longitudinal member and the stems of the cargo.

In this embodiment, member 52 does not contact or abut the corresponding corner of cargo 58 and it is not a requirement that either member 50 or 52 contact a corner of cargo 58. Thus, in an alternate embodiment, member 50 may not contact a corner of the cargo while member 52 provides such contact, or both members 50 and 52 may not contact corners of the cargo. In addition, the distance by which either member may fail to touch the corner may vary. While FIG. 1 shows member 52 extending approximately halfway to a corner of cargo 58, member 52 (or another member) may optionally extend closer to or further from the corner the cargo 58. Optionally, either member 50 or member 52 may be eliminated, or additional members may be used, so long as not more than one member (and optionally none of the members) touches a corner of the cargo. Also optionally, member 50 and/or member 52 may have a plate 28 or 29 or other protruding element that fills all or part of the gap between the member and the downwardly extending leg of the cargo.

Preferably, an eyelet 66 is provided on member 52 for receiving a chain or cable to secure member 52 to the base of the rack or floor of a trailer or other vehicle on which the rack is mounted. Rod 68 having a handle at one end is pivotably attached at the other end to arm 24 and may be used by a workman to pull arm 24 upwardly from its downwardly inclined position to a substantially horizontal position when the rack is empty.

Figure 2:
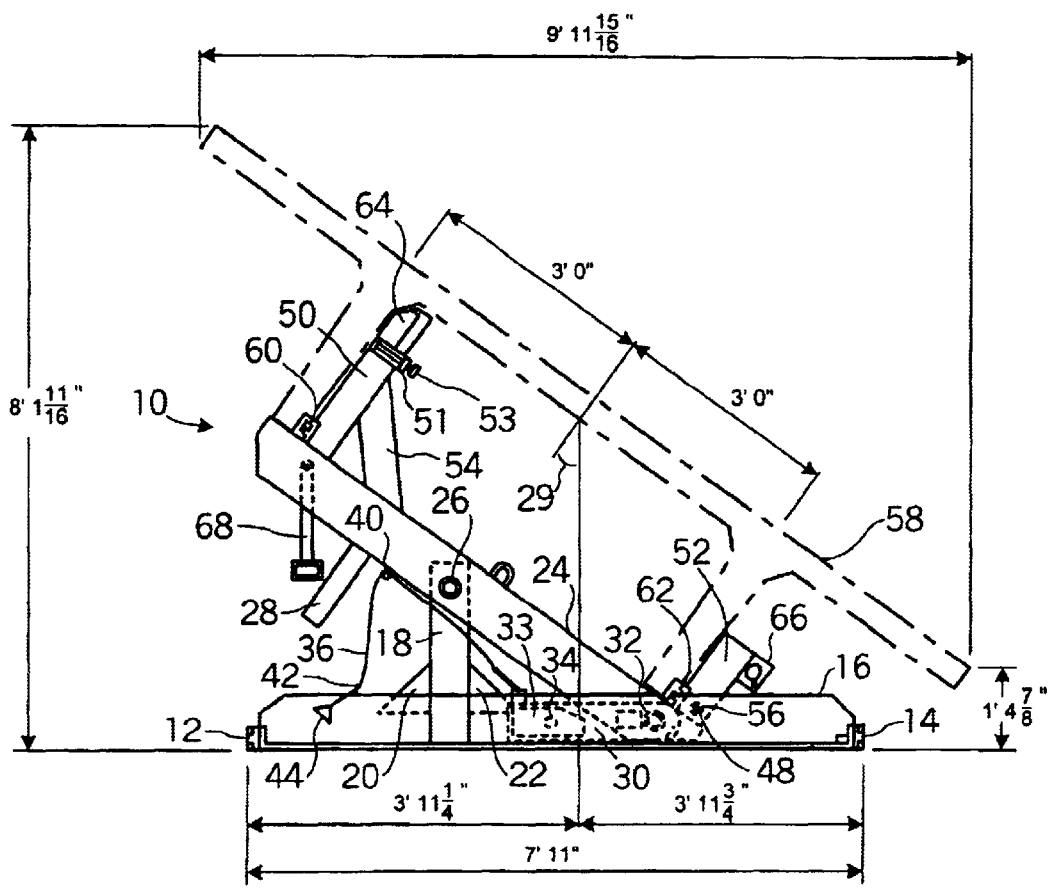
FIG. 2 provides a side elevation view illustrating the embodiment of FIG. 1 in a tilted position.

In operation the cargo rack is secured in the substantially horizontal position in preparation for loading. Pin 48 is moved so as to engage pipe 34 in foot member 33 and the lever attached to pin 48 is locked in position so that pin 48 will not be accidentally disengaged. Bolt assembly 53 is turned in a sleeve 51 so as to move inwardly to a retracted position. Cargo 58 which, as shown for example in FIG. 1 is in the form of a pre-cast concrete double tee, is lowered by a crane into position slightly above or just barely touching longitudinal arm 24. The lever arm is unlocked and moved so as to disengage pin 48 from pipe 34 in foot member 33. A workman pulls handle 44 in order to cause cable 36 to pull on foot member 33 pivoting foot member 33 to an inwardly inclined position toward fixed vertical support post 28. The crane is then directed to lower cargo 58 gently so as to rest fully or substantially fully on longitudinal arm 24. Bolt assembly 53 is then turned so as to move outwardly to an extended position to contact and support a downwardly extending leg of cargo 58. This provides support for cargo 58 and allows the operator to more precisely control the point of load application. The crane is then moved so as to cause cargo 58 to rotate arm 24 downwardly to the right in FIG. 1 to the inclined transport position. The lever attached to pin 48 moves pin 48 into engagement in pipe 56 of member 52. The lever is then locked in position. Cables or chains are threaded through eyelet 66 on member 52 to secure the cargo in position on the rack. FIG. 2 illustrates a preferred embodiment of the cargo rack in a tilted transport position. Preferably, for a double-tee having a width of approximately twelve feet (as shown in FIG. 2), the angle of incline 29 is between thirty and forty degrees, more preferably approximately thirty-four degrees. Other inclines are possible depending upon the width of the double-tee. Optionally, but not preferably, the cargo rack may be placed in a tilted position prior to loading, and a crane may then be used to carefully place the cargo on the tilted rack.

The embodiment illustrated in FIGS. 1 and 2 illustrated an embodiment where the center of gravity of the cargo 13 is located above the pivot point at pin 26 when the cargo is in a horizontal loading position. When the cargo is tilted, as shown in FIG. 2 the center of gravity may shift in the general direction of the tilt (illustrated as to the right and down in FIG. 2). However, the cargo rack may also be designed in an alternative manner so that the center of gravity of the cargo does not substantially move to the left or the night when the cargo is tilted.

It is also notable that the dimensions shown in FIGS. 1 and 2 are preferred dimensions for a twelve-foot double tee, and that other dimensions are possible for a twelve foot tee. Other dimensions are probable for a double tee of another size. For example FIG. 3 shows preferred dimensions of a cargo rack for a double tee having a fifteen-foot width.

Figure 3:
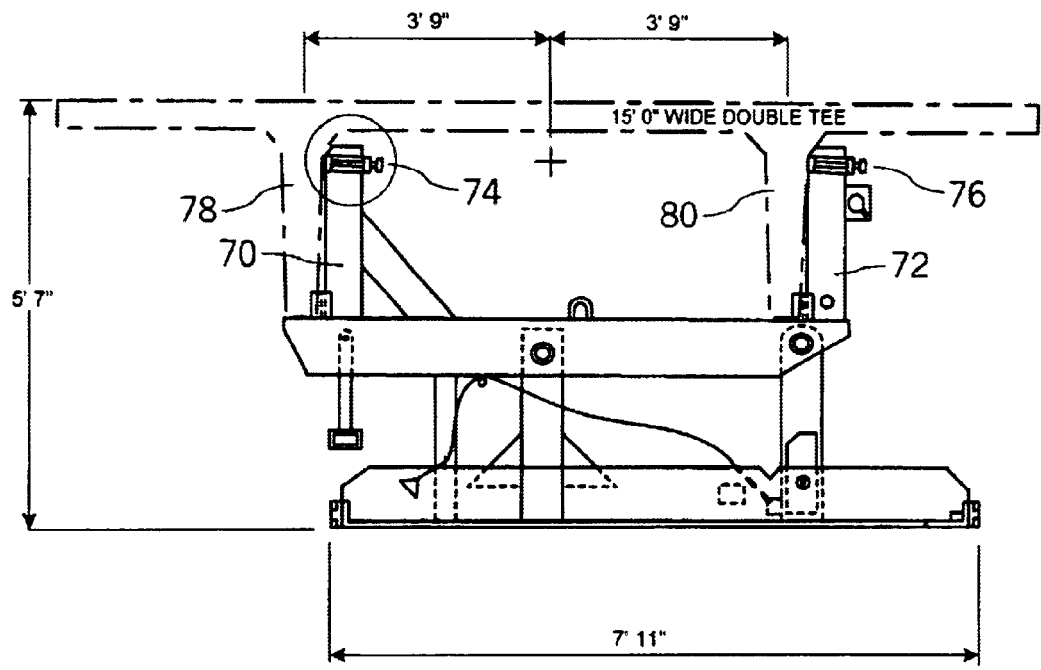
FIG. 3 illustrates an alternate embodiment of the present invention.

FIG. 3 also illustrates an alternate embodiment of the cargo rack wherein two of the perpendicular members 70 and 72 include bolt assemblies 74 and 76 that may be turned and adjusted to an extended position (to the left in FIG. 3) for contact and support of the legs 78 and 80 of the cargo. A pressure plate may be attached or secured to the end of either or both bolt assemblies 74 and 76 for contact with the leg(s) 78 and 80 of the cargo in order to spread the force for support of the leg over a greater area. Alternatively, a double-tee having a fifteen-foot width may be carried on an assembly having the features shown in FIGS. 1 and 2 with adjusted dimensions, as appropriate. The bolt assemblies are optional and may be included with one of the perpendicular members, more than one of the perpendicular members, or none of the perpendicular members.

FIG. 4 provides a close-up view of the extendable bolt assembly (51/53 in FIGS. 1 and 2 and 74 and 76 in FIG. 3), which may be included in a sleeve device that extends to contact and support a leg of the cargo. Referring to FIG. 4, support arm 90 is equipped with an outer sleeve 91 and an inner sleeve 92, each of which may be a metal pipe or other cylinder or other-shaped sleeve. Outer sleeve 91 has an inner diameter that is at least slightly larger than the outer diameter of inner sleeve 92. For example, in a preferred embodiment the inner diameter of outer sleeve 91 may be approximately 2.9 inches, and the outer diameter of inner sleeve 92 may be appropriately 2.875 inches. Outer sleeve 91 is attached to support arm 90, such as by welding, or it may be integral with support arm 90. The inner sleeve 92 is not attached to outer sleeve 91, and it also has a length that is less than that of outer sleeve 91 so that inner sleeve 92 may move within and be retracted into outer sleeve 91.

A bolt 93, which may alternatively be a threaded rod or other appropriate item, extends into the outer and inner sleeves and has a length that is longer than that of both sleeves. A first nut 94 or other gripping means is attached to bolt 93 at or near a first end of bolt 93, such as by welding, to provide a secure gripping point for turning the bolt 93. Alternatively, if bolt 93 has an integral head or other grippable element, first nut 94 may not be necessary. Preferably, a second nut 95 and optional washer 96 are fixedly attached to the outer sleeve 91 or support arm 90, such as by welding, to provide further stability outside of outer sleeve 91. One or more washers 97 and 98 are also secured, such as by welding, to inner sleeve 92 and/or to each other to receive bolt 93 and provide further stability. A plate 99 or washer is secured to the other end of bolt 93 to provide a surface that contacts and preferably presses against the downwardly extending leg of cargo 58 when the bolt is turned so that the plate 99 extends outside of the inner and outer sleeves.

When the cargo is loaded onto the cargo rack in a horizontal position, bolt 93 is in a retracted position. After the cargo is placed onto the assembly, bolt 93 is turned so that plate 99 protrudes from or exits the outer and inner sleeves and touches the vertical support member of the cargo rack. Thus, plate 99 and its related elements in the bolt assembly will provide additional support and bracing of the cargo when the cargo is turned into a tilted transport position. If one bolt assembly is used, or if two or more bolt assemblies are used, preferably each bolt assembly is so engaged to contact a support arm before the cargo is turned to a tilted transport position.

Figure 5:
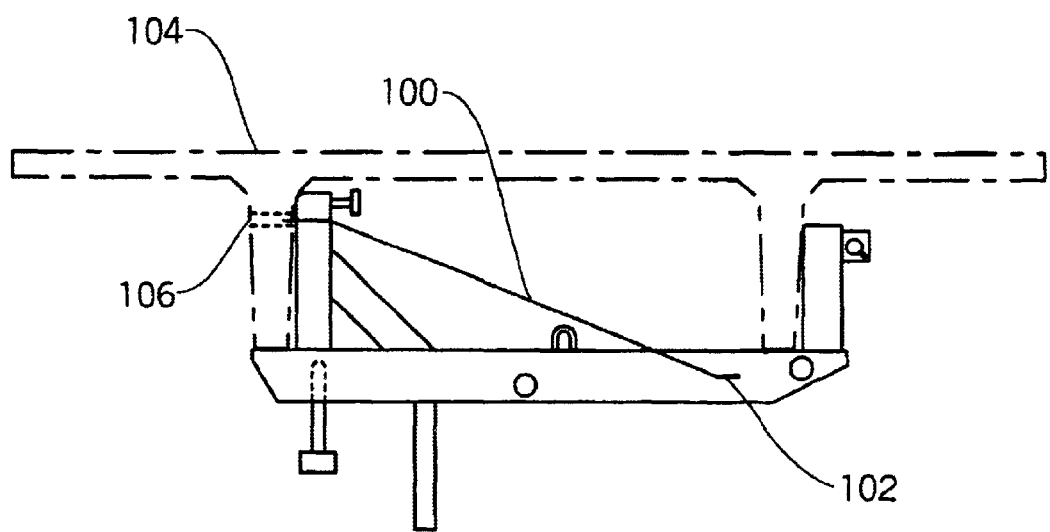
FIG. 5 illustrates an additional, optional, support element in a preferred embodiment of the invention.

FIG. 5 illustrates an optional, additional support element in a preferred embodiment of the cargo rack. A chain 100 or high-strength wire is connected to the cargo rack at a clip 102, eyelet, hole, or other assembly that can receive and secure an end of chain 100. Preferably the location of clip 102 is closer to the support arm that will be in a lower position after tilting of the cargo rack than it is to the upper support arm. The clip 102 is preferably welded or otherwise attached to the longitudinal arm of the cargo rack, although it may optionally be integral with the arm, or it may be located on or integral with the lower support arm or another location. The other end of chain 100 is secured to the cargo 104 itself, preferably through a hole 106 that is drilled or otherwise formed in a stem of the cargo 104. The chain is tightened after the cargo is loaded onto the rack in a substantially horizontal position, thus providing additional support when the cargo and rack are moved to a tilted transport position.

Returning to FIGS. 1 and 2, to unload the cargo, a crane is lowered and cables or chains are attached to eyelets (not shown) in cargo 58. The cables or chains through eyelet 66 in member 52 are loosened and removed from eyelet 66. The lever attached to pin 48 is unlocked and moved so as to disengage pin 48 from pipe 56 of member 52. The crane is then moved slowly so as to rotate cargo 58 and longitudinal arm 24 counter clockwise to a substantially horizontal position. Foot member 33 is pushed into a vertical attitude so that pin 48 may be re-engaged in pipe 34. Bolt 53 is then turned so as to move to a retracted position out of contact with downwardly extending leg of cargo 58. Chain 100, if present, is removed. The crane is then raised so as to remove cargo 58 from longitudinal arm 24. The cargo rack is then in position for receiving another load of cargo. Thus, the invention provides a tiltable cargo rack that is securely supported in the horizontal position and which may be safely rotated to the inclined transport position when desired.

There have thus been outlined the more important features of the invention in order that the detailed description that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present invention. It is important, therefore, that the claims be regarded as including such equivalent constructions insofar as they do not depart from the spirit and scope of the present invention.

We claim:

1. A cargo rack, comprising:
    a longitudinal arm for support of cargo, said longitudinal arm being rotatable from a substantially horizontal loading position to an inclined transport position;
    at least one support member to support the arm securely in a substantially horizontal loading position, wherein at least one of the support members is selectively moveable from a support position to a retracted position in order to permit rotation of the longitudinal arm to an inclined position for cargo transport, wherein said moveable support is pivotable to a retracted position that is substantially parallel to the longitudinal arm; and
    at least one leg that is attached to and substantially perpendicular to the longitudinal arm, wherein no more than one of the legs contacts and supports a corner of the cargo.

2. The cargo rack of claim 1 wherein no leg contacts and supports a corner of the cargo.

3. The cargo rack of claim 1 wherein said movable support is pivotably connected to said longitudinal arm.

4. The cargo rack of claim 3 wherein said movable support includes a foot pivotably attached to said support at an end opposite from an end of the movable support that is connected to said longitudinal arm.

5. The cargo rack of claim 1 wherein the movable support is a post.

6. The cargo rack of claim 1 further comprising a selectively engageable and disengageable lock for alternately engaging the movable support to secure it in the vertical support position and disengaging the support to permit said support to move to a retracted position.

7. The cargo rack of claim 1 wherein at least one leg extends in a substantially perpendicular direction from said longitudinal arm for at least partial support of the cargo.

8. The cargo rack of claim 1 further comprising an extendable assembly located within at least one of the legs for further supporting the cargo.

9. The cargo rack of claim 8 wherein the extendable assembly comprises:
    a sleeve; and
    a movable structure located within the sleeve, wherein the movable structure may be extended from the sleeve to contact the cargo.

10. An apparatus for transporting cargo, comprising:
    a longitudinal arm, said longitudinal arm being rotatable from a substantially horizontal loading position to an inclined transport position; and
    at least one bracing arm extending upwardly and in a substantially perpendicular direction from the longitudinal arm;
    wherein at least one of the bracing arms includes an extendable assembly for providing at least partial support of the cargo, wherein the extendable assembly comprises a sleeve device, a moveable structure located within the sleeve device, and a grippable member for extending the moveable structure from the sleeve device to contact the cargo and retracting the moveable structure into the sleeve device.

11. The apparatus of claim 10 wherein the moveable structure comprises an inner sleeve.

12. The apparatus of claim 11 wherein the moveable structure further comprises a planar structure for contacting the cargo.

13. A cargo rack, comprising:
    a longitudinal arm, said longitudinal arm being rotatable from a substantially horizontal position to an inclined transport position;
    at least one bracing arm extending from the longitudinal arm;
    wherein at least one of the bracing arms includes an extendable assembly, wherein the extendable assembly comprises a sleeve device and a movable structure, and a grippable member for extending the movable structure from the sleeve device and retracting the movable structure into the sleeve device.

14. A cargo rack, comprising:
    a longitudinal arm for support of cargo, said longitudinal arm being rotatable from a substantially horizontal loading position to an inclined transport position; and
    one or more bracing arms, said one or more bracing arms extending from the longitudinal arm in a substantially perpendicular direction, at least one of said bracing arms having a length so that when the cargo is loaded on the rack, no more than one bracing arm contacts or supports a corner of the cargo,
    wherein at least one of the bracing arms includes an extendable assembly, wherein the extendable assembly comprises a sleeve device, a moveable structure, and a grippable member for extending the moveable structure from the sleeve device and retracting the moveable structure into the sleeve device.

15. The cargo rack of claim 14 wherein no bracing arm contacts or supports a corner of the cargo.

16. The cargo rack of claim 14 further comprising a plurality of horizontally spaced supports that support the longitudinal arm when in the substantially horizontal loading position.

* * * * *